April 14, 1931.  H. M. BROWN  1,801,236
SIGNAL
Filed May 15, 1926  2 Sheets-Sheet 2
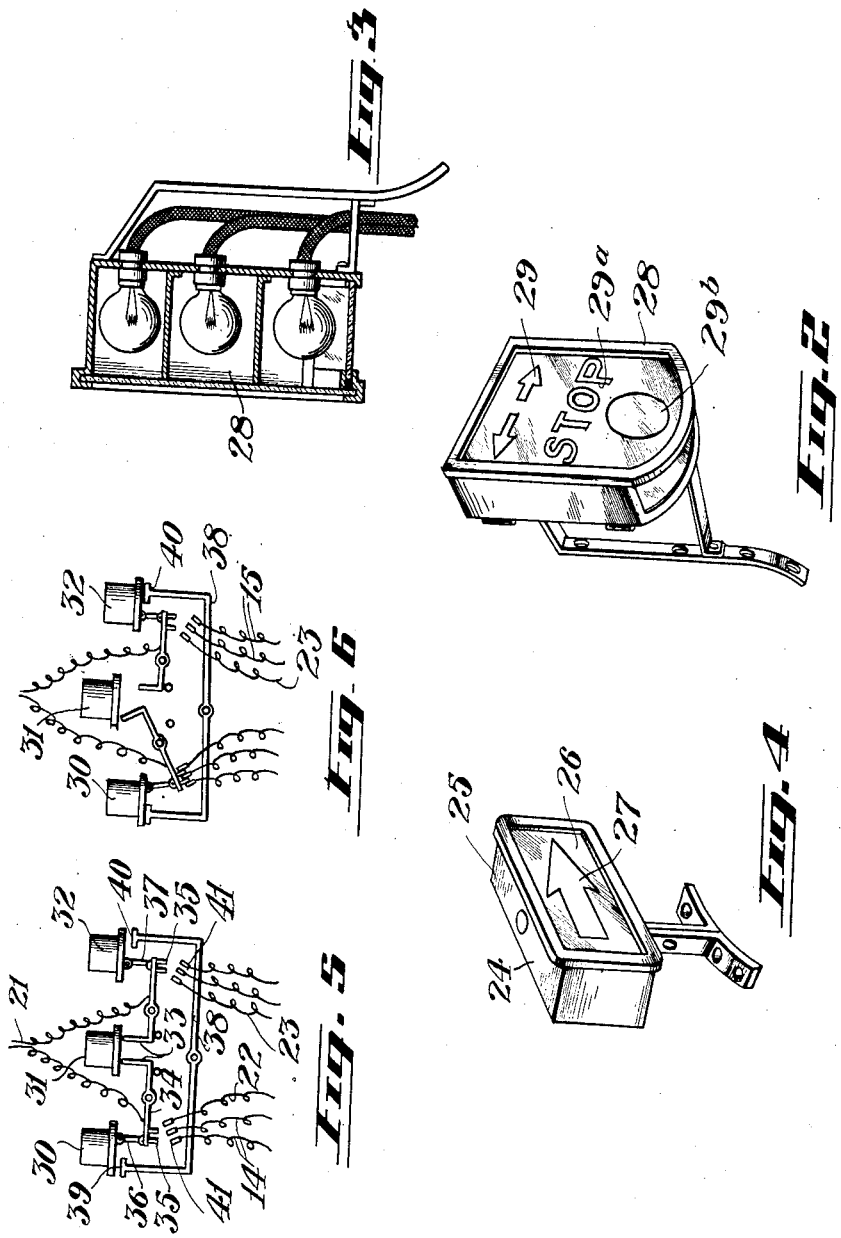
INVENTOR
Hartley. M. Brown
By Harold D. Penney,
Attorney Patented Apr. 14, 1931

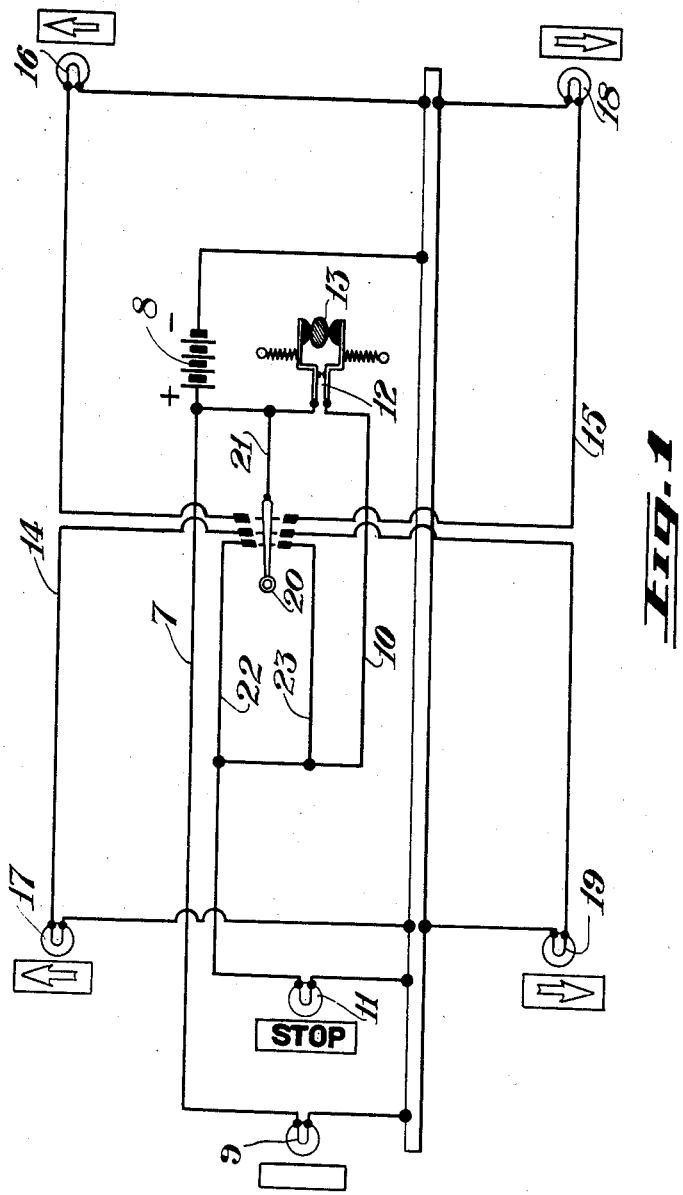

1,801,236

UNITED STATES PATENT OFFICE

HARTLEY MORTON BROWN, OF COLLINGWOOD, ONTARIO, CANADA

SIGNAL

Application filed May 15, 1926. Serial No. 109,308.

This invention relates to improvements in a signal for motor vehicles and the like appertaining particularly to an electric direction indicator, operable from the drive seat while the vehicle is in motion, whereby the operator may adequately acquaint the traffic about him of his intentions; operators of approaching and following cars being appraised of his proposed stops and turns.

The principal object is to provide a simplified signal system including in an electric circuit, in addition to the usual tail light and license plate illuminating means, a stop light and direction indicating arrows mounted in the front and rear of the vehicle; the corresponding front and rear arrows indicating a turn to either side being illuminated simultaneously and with the stop signal also being displayed.

A further object is to provide a signal system as aforesaid wherein a unitary switch controls the operation of the signals to illuminate the front and rear signal lights on either side together with the stop light but independent of which the stop light alone, on the actuation of the brake pedal, may be shown.

A further object is the provision of a signal system including an improved switch adapted to selectively show side lights together with the stop light wherein after the showing of the signals on one side, the alternate side lights cannot be illuminated without the first selected signal circuit being broken, thus effectively preventing confusion and annoyance on the reading of the lights.

A still further object is the provision of a signal characterized by structural simplicity, that is definite and complete in its directions, is easily operated and capable of production and installation at a reasonable cost, being thereby rendered commercially desirable.

To the accomplishment of these and related objects that will become apparent as the description proceeds, the invention resides in the construction, combination and arrangement of parts as shall be hereinafter more fully described, illustrated in the accompanying drawings and pointed out in the claim hereunto appended.

The invention will be best understood and can be most clearly described when reference is had to the accompanying drawings, forming a part of this disclosure wherein, Fig. 1 is a diagram of the electrical circuits employed in this signal;

Fig. 2 is a perspective view of a possible form of rear light, embodying the usual tail lamp and license plate illuminator and, in addition, a stop light and selective direction indicating arrows;

Fig. 3 is a vertical section therethrough;

Fig. 4 is a perspective view of a possible form of individual direction indicating arrow, and Figs. 5 and 6 are diagrams of the preferred form of switch for controlling the signal operating circuits, being shown in vertical and operative positions respectively.

Referring now particularly to these drawings wherein like characters indicate like parts throughout the several views, the numeral 7 designates an electric circuit, in a motor vehicle, including a battery 8 and a switch controlled tail lamp and license plate illuminator 9, the battery and tail lamp being grounded to the automobile frame.

Tapping this circuit, between the positive battery terminal and the tail lamp controlling switch is a second circuit 10, that also grounds to the frame, this including a stop light 11 and a normally opened circuit breaker 12 closed on the actuation of the brake pedal 13.

Selective or alternative circuits 14 and 15, each include a front and a rear signal light 16, 17 and 18, 19 respectively, in the form of direction indicating arrows. These circuits which include the battery 8 ground also to the automobile frame at the lights. A switch 20, normally open and connected to the battery by the lead 21, selectively closes one or other of the circuits 14 and 15. In Fig. 1, the leads to this switch 20 from the individual front and rear signal lights on each side are shown separate though it is obvious, as they are closed simultaneously in right or left side pairs, the switch lead in each case of corresponding front and rear side lights could be unitary.

In addition to selectively operating the front and rear signal lights on either side of the vehicle, the operation of this signal 20, to close either of the side light circuits 14 or 15, illuminates the stop lamp 11 by completing either one of the circuits 22 or 23.

Thus is will be seen that the tail light circuit 7 or the brake pedal controlled stop light circuit 10 may be closed independently of each other or of any other circuit provided; that the right front and rear signal light circuit 14 or the left front and rear signal light circuit 15 may be selectively controlled by the operation of the common switch 20 and that on the closing of either of these latter selective circuits 14 and 15, the stop lamp 11 is illuminated and so illuminated independently of the circuit 10.

In this invention, I purpose mounting the left and right front lights 16 and 18 and the left and right rear lights 17 and 19 respectively on the respective fenders, though they may obviously be placed in any other conspicuous and desired location, and will preferably take the form of the signal light 24, illustrated in Fig. 4, having an electric light bulb, not shown, in the circuit, mounted in a casing 25 with a more or less transparent glass 26 displaying a direction indicating arrow-head 27 pointing away from the vehicle.

A modified form of signal light 28, suitable for the rear of the vehicle, is shown in Figs. 2 and 3. Here the oppositely pointing direction indicating arrows 29, the stop signal 29$^a$ and the tail light and license plate illuminator 29$^b$ are all combined in the one casing. The bulb encasing compartments for the arrows 29 are suitably divided but it is obvious that the several circuits or the control of them are in no ways altered by this combined arrangement though considerable saving of wire and other materials is effected by their grouping.

The switch 20 is diagrammatically illustrated in Fig. 1 of the drawings as a knife switch, normally breaking both circuits 14 and 15 and on movement to one side or the other, selectively closing the one desired. The preferred button type of circuit closer to operate in this position is illustrated in Figs. 5 and 6. Three reciprocating buttons 30, 31 and 32 are employed. They are arranged horizontally on the dash of the vehicle and from left to right are denominated, having suitable indications thereon, "Left", "Off" and "Right". Beneath the centre button 31 are the upturned inner ends 33 of a pair of insulated and centrally fulcrumed levers or bell cranks 34 on whose outer ends 35 are circuit contact points. These bell cranks 34, near their outer ends, connect to their respective buttons 30 and 32 by the links 36 and 37 respectively. The battery lead 21 connects with these bell cranks 34. A centrally pivoted lever 38 lies back of this mechanism having its ends 39 and 40 bent toward the buttons 30 and 32 respectively and terminating a short space therefrom. Contacts 41 connecting with the circuits 14, 15, 22 and 23 are suitably located in the arc of travel of the pivot ends 35 of the bell cranks 34. On the depression of the "Left" button 30 the bell crank 34 with the circuit contact points on its outer end 35 is hinged into engagement with the fixed contact points 41 to complete and close the circuits 14 and 22 through the medium of the link 36, the upturned inner end 33 of this bell crank 34 pushing upwardly on the centre "Off" button 31. Simultaneously the lever 38 is tilted, the end 39 being depressed to shove outwardly on the end 40. It is here pointed out that the normal clearance space between the ends 39 and 40 of the lever 38 and the buttons 30 and 32 respectively is just one half the distance the buttons travel to bring the contact point end of bell crank levers 34 into engagement with the fixed contacts 41, thus it will be seen that on the depression of the button 30, here being explained in detail, the said button would move to bring the contacts on the bell cranks 34, halfway in their travel into engagement with the fixed contacts 41 before the lever 38 would be moved and that the final half of the travel of the button will tilt the lever 38 just sufficient to bring the remote end into engagement with the button 32.

To break the circuits 14 and 22, the centre "Off" button 31 is depressed, its extended position always indicating the operative engagement of one or other of the circuit closing buttons 30 and 32, thus hinging the bell crank 34 out of circuit closing position by bearing on the upturned end 33, simultaneously carrying the "Left" button 30 back to normal position and thereby freeing the upturned ends of the lever 38 from engagement with the buttons 30 and 32. Had it been desired to signal a right turn immediately following the left turn indicated by the depression of the "Left" button 30, the "Right" button 32 could have been depressed. This would operate to break the circuits 14 and 22 before more than halfway depressed by the tilting of the lever 38 bearing upwardly on the "Left" button 30 drawing upwardly on the associated bell crank 34 by the link 36. On the completion of the depression of the "Right" button 32, the "Left" button 30 would be fully returned to its normal position and there locked by the said lever 38 while the bell crank 34 associated with the button 32 by connection of the link 37 is brought into engagement with the fixed contacts 41 leading to circuits 15 and 23. The depression of the still outstanding "Off" button 31, which may be spring urged to normally maintain its closed position will similarly operate to return the "Right" button 32 to normal position breaking these completed circuits.

So it will be observed that on the depression of the proper button, the desired side of direction indicating signals at both front and back of the vehicle together with the stop light may be displayed and though on the depression of the centre "Off" button the circuits are broken, or, on the operation of the alternate button, the other side direction indicating lights together with the stop light are illuminated with the first side closed circuits simultaneously broken: At no time can the direction indicating signal lights at both sides be displayed together.

From the foregoing description taken in connection with the accompanying drawings, it will be manifest that a signal for motor vehicles is provided which will fulfill all the necessary requirements of such a device, but as many changes could be made in the above description and many apparently widely different embodiments of my invention constructed within the scope of the appended claim without departing from the spirit or scope thereof, it is intended that all matters contained in the said accompanying specification and drawings shall be interpreted as illustrative and not in a limited sense.

What I claim as new and desire to secure by Letters Patent is:—

A three button single control switch for a multiple circuit electric system, including a U-shaped centrally fulcrumed double lever; a pair of outer circuit closing buttons normally spaced from the free ends of the respective arms of said U-shaped centrally fulcrumed double lever; a pair of smaller U-shaped levers arranged in alignment within said centrally fulcrumed double lever with the outer arms of said pair of smaller U-shaped levers pivoted to the respective circuit closing buttons; said pair of smaller levers being each centrally fulcrumed with their free ends normally in parallel relation; a plurality of stationary spaced contacts fixed adjacent each of said smaller levers; co-operating contacts carried by each of said smaller levers for engagement with the respective pluralities of fixed contacts adjacent the same when said smaller levers are operated by the respective outer circuit closing buttons; a common current conducting member connected with said pair of smaller levers; and a central circuit breaking button above and resting on the inner arms of said smaller levers when the latter are in normal unoperated position; said central circuit breaking button being adapted to be raised by either of said pair of smaller levers when the latter is operated; said central circuit breaking button being also adapted to be employed for returning either of said smaller levers and the circuit closing button connected therewith to their normal unoperated positions.

In testimony whereof I hereunto affix my signature.

HARTLEY MORTON BROWN.